United States Patent [19]

Eberly, Jr. et al.

[11] 3,793,121

[45] Feb. 19, 1974

[54] METHOD AND APPARATUS FOR MANUFACTURING MITTS

[75] Inventors: David H. Eberly, Jr., Fairfield; Charles R. Schwartz, Wilton, both of Conn.

[73] Assignee: United States Banknote Corporation, New York, N.Y.

[22] Filed: Dec. 14, 1971

[21] Appl. No.: 207,946

[52] U.S. Cl............... 156/522, 156/269, 156/291, 156/301, 156/541, 156/548
[51] Int. Cl.......................... B32b 31/00, B32b 7/14
[58] Field of Search..... 156/269, 90, 238, 249, 291, 156/548, 300, 301, 552, 578, 77–79, 516, 156/383, 522, 549; 15/227, 104.94; 53/178, 183

[56] References Cited
UNITED STATES PATENTS

| | | | |
|---|---|---|---|
| 2,511,303 | 6/1950 | Stevens et al.................. | 156/269 X |
| 2,382,929 | 8/1945 | Williams......................... | 156/548 X |
| 3,377,773 | 4/1968 | Clark.............................. | 53/178 |
| 3,299,464 | 1/1967 | O'Brien et al................... | 53/183 X |
| 2,979,246 | 4/1961 | Liebeskind...................... | 156/78 X |
| 2,946,370 | 7/1960 | Muttera, Jr..................... | 156/552 X |
| 2,790,982 | 5/1957 | Schneider....................... | 15/227 |
| 3,608,708 | 9/1971 | Storandt......................... | 15/227 |

Primary Examiner—Douglas J. Drummond
Assistant Examiner—M. G. Wityshyn
Attorney, Agent, or Firm—Cushman, Darby & Cushman

[57] ABSTRACT

A method and apparatus for manufacturing disposable mitt for shining shoes having a first sheet of buffing material which is glued to a second sheet of material to which is attached a mass of quality shoe shine material for example in microcapsules or a sponge attached to the second sheet. A third sheet of material is removably glued to the side of the second sheet opposite the side to which the first sheet is glued so as to form a closed pocket which protects the shoe shine material in the microcapsules or sponge. Such a mitt can be made by continuously forming spongy masses at separated locations on a continuously moving sheet of the first material or depositing and attaching a suitable number of microcapsules, depositing patterns of glue at separated locations on a continuously moving sheet of the second material, pressing the first two continuously moving sheets together to form pockets, depositing suitable patterns of glue on a continuously moving sheet of the third material, pressing the third and second sheets together so that each pattern of glue on the third sheet defines a closed pocket which contains the shoe shine material and cutting the moving sheets to form the disposable mitts.

7 Claims, 8 Drawing Figures

METHOD AND APPARATUS FOR MANUFACTURING MITTS

DESCRIPTION OF THE INVENTION

The invention relates to an apparatus for forming disposable mitts, particularly for shining shoes, and a method of forming such mitts.

Many shoes on the market today must be periodically shined in order to maintain a glossy appearance with a uniform color. The usual way of carrying out this chore is by first applying, with an applicator, brush, or the like, a paste or liquid shoe polish, and then buffing the shoe with a cloth. Keeping on hand a fresh supply of shoe polish and satisfactory cloths and applicators for this task is one of the minor nuisances of modern life. The inevitable soiling of hands and other immediate objects with the shoe polish is also annoying. In order to eliminate the unpleasantries of this task, disposable shoe shine mitts have been developed and one such mitt is shown, for example, in the Schneider U.S. Pat. No. 2,790,982. In this patent, in particular, an applicator is provided with three layers of material and a capsule of shoe shine polish trapped between one of the two outer layers and the middle layer. The outer layers are formed by folding a single sheet of material and bonding the edges together.

One difficulty with existing applicators is that they have not provided both a satisfactory way of cleanly applying the shoe shine polish and a separate sheet of suitable buffing material for buffing the shoes after application of the polish in the conventional manner. Accordingly, the shine possible with the applicator alone has been of considerably lower quality than that which is possible by the conventional techniques described above. Another difficulty is that previously the mitts have not been produced economically and quickly enough to permit them to be priced in the market place so as to be a truly attractive product for general use.

The present invention relates to a method of and apparatus for forming a mitt which is comprised of a first sheet of silicone-impregnated buffing material which is glued to a second sheet of material to which is attached a spongy mass of material containing a high quality shoe shine material, preferably in liquid form or a number of microcapsules each similarly containing such shoe shine material. Such a mitt is disclosed and claimed specifically in a copending application entitled "Mitt" by Hobson Miller, filed herewith, the disclosure of which is explicitly incorporated herein by reference. A third sheet of material is glued to the side of the second sheet opposite the side to which the first sheet is glued so as to form a closed pocket containing the spongy mass which prevents the shoe shine material in the spongy mass from evaporating or similarly protects the microcapsules from breakage. A mitt with the spongy mass can be used by simply removing the third sheet so as to expose the spongy mass, rubbing the spongy mass over the surface of the shoe so as to deposit the shoe shine material on the surface of the shoe, reversing the mitt on the hand and buffing the shoe with the sheet of buffer material. To use a mitt with microcapsules, the third sheet need not be removed. Instead as the third sheet is rubbed over a shoe, the microcapsules break and the polish thus liberated moves continuously through the third layer onto the shoe in small suitable quantities. Using this mitt and technique, an excellent shine which is comparable in quality to shines obtainable with the conventional technique described above is possible.

According to one aspect of this invention, such a mitt can be formed by an apparatus and according to a method whereby the spongy masses of material are formed at discrete intervals onto a continuously moving sheet of the second material. The spongy masses can be deposited on the sheet in fluid form as a foam and then subsequently dried or can be removed from a roll of material having the spongy masses removably glued onto a substrate. Alternatively, masses of microcapsules can be deposited on the sheet at discrete intervals and attached by any suitable means, for example glue. A pattern of glue can then be deposited at discrete separated locations onto a continuously moving sheet of the first material, preferably by a roller, and the first and second sheets then pressed together to form pockets each having an open end between the sheets. A suitable pattern of glue is similarly disposed at separated intervals on a continuously moving sheet of the third material, and then the third sheet is pressed atop the second sheet so that each pattern of glue on the third sheet defines a closed pocket which contains a sponge mass impregnated with shoe shine liquid or the microcapsules. The continuously moving sheets can then be cut to form disposable mitts of the type described above.

Many other objects and purposes of the invention will become clear from the following detailed description of the drawings.

DETAILED DESCRIPTION OF THE DRAWINGS

Figure 1:
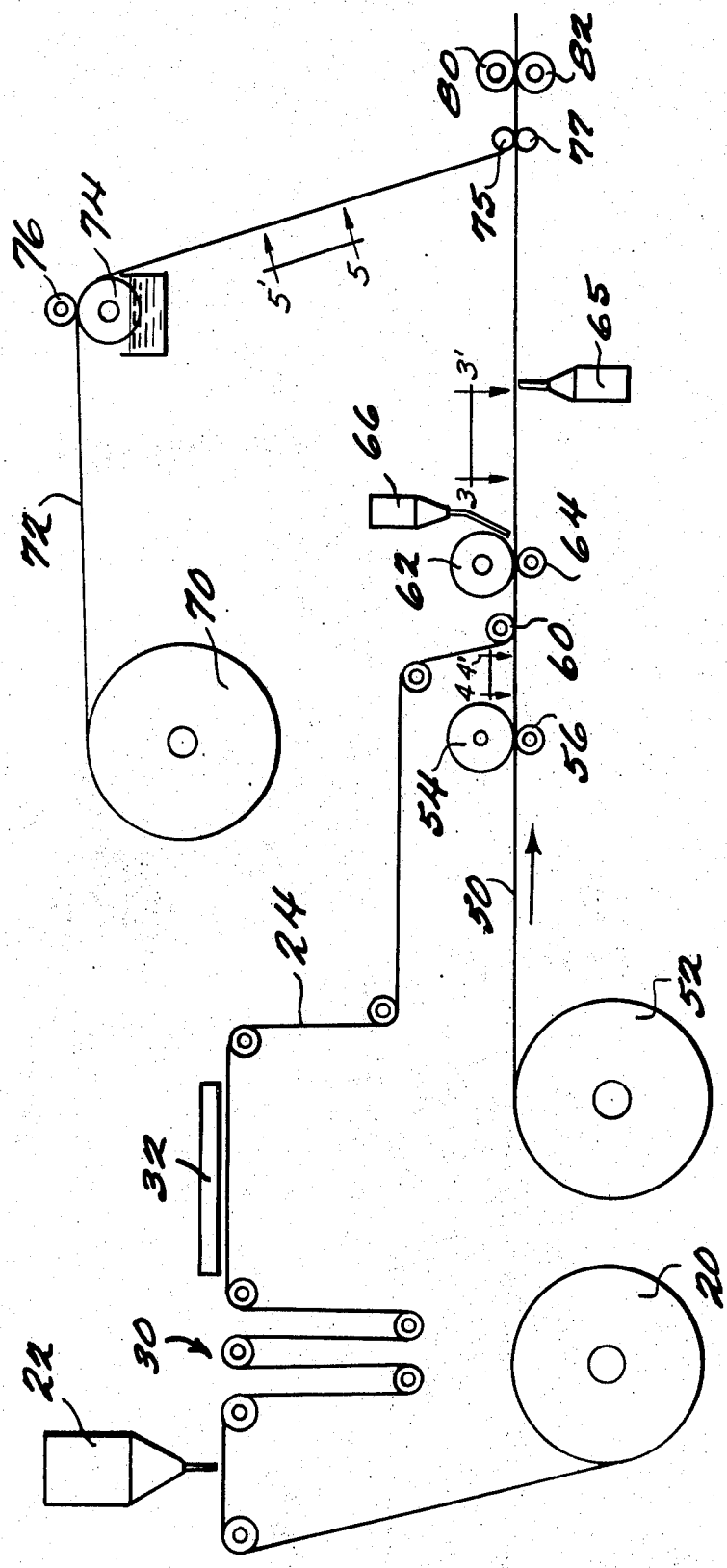
FIG. 1 shows a schematic view of an apparatus for producing a disposable shoe shine polishing mitt.

Reference is now made to FIG. 1 which shows one embodiment of an apparatus according to this invention for forming a disposable shoe shine mitt. In the arrangement shown in FIG. 1, an extending sheet of substrate material 24, which is wound on a conventional roller 20, is continuously unwound and moved in the direction indicated by the arrow by any suitable means past an apparatus 22 which periodically deposits a mass of foam material onto the continuously moving sheet of material 24, which is preferably a polymer film. After deposit on material 24, the spongy masses pass through a dwell region 30 over a plurality of rollers where the material foams before entering the region adjacent conventional dryer 32 where the foam material deposited is heat cured to produce masses of spongy material which are capable of absorbing liquid shoe shine polish.

Figure 3:
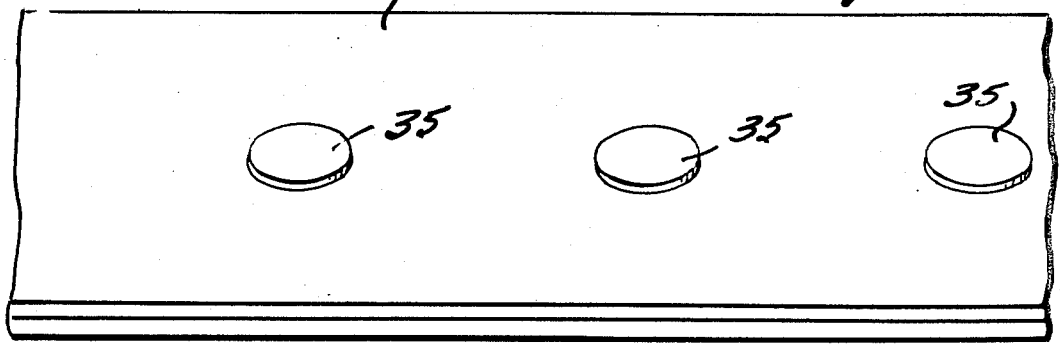
FIG. 3 shows a view of the second sheet along the lines 3—3'.

FIG. 3 shows a view of sheet 24 with separated spongy masses 35.

Figure 2:
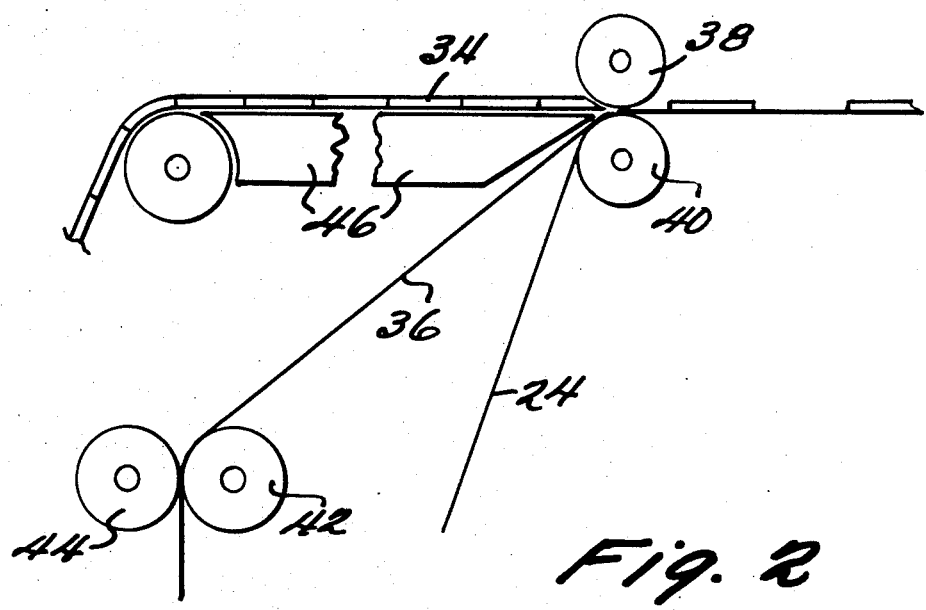
FIG. 2 shows an alternative arrangement for forming the sponge masses on the second sheet of material.

FIG. 2 shows an alternative arrangement for forming sponges on material 24. In this arrangement a plurality of preformed sponge pads 34 are each provided with a contact sensitive glue applied to their bottom which removably attaches them to a glue-protective paper 36. Material 24 moves continuously between rollers 38 and 40 in the direction indicated. Rollers 42 and 44 are driven intermittently to pull the glue protecting paper 36 around the sharp edge of the support 46 and advance another preformed sponge pad between the continuously rotating rollers 38 and 40 which pull each pad in turn from paper 36 and press it into contact with material 24 so that it is glued to material 24.

Figure 4:
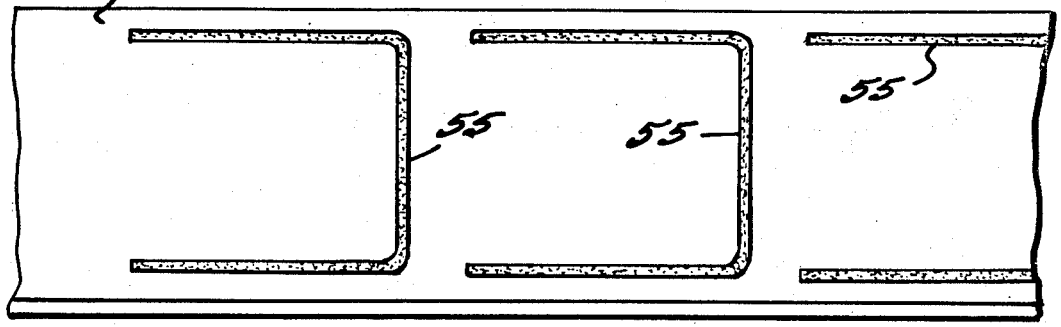
FIG. 4 shows a view of the first sheet along the lines 4—4'.

At the same time that the spongy masses are being formed on material 24, material 50, which is the material which forms the buffer in the disposal mitt, is being unwound from conventional roller 52. Material 50 moves continuously in the direction indicated by the arrow and between two continuously rotating rollers 54 and 56. Roller 54 is a hardened cylinder upon which has been drilled a small dimple pattern which conforms to the glue pattern which is desired to be deposited upon material 50 and which can be seen in FIG. 4. As cylinder 54 rotates, the dimples are filled with a hot-melt glue, the excessive glue is scraped away and the glue is transferred to the moving material 50 as it passes between rollers 54 and 56 in the same way that an intaglio impression is printed on a piece of paper. Heat is required to melt the glue and, accordingly, suitable means for doing this are preferably provided for keeping the printing cylinder 54 hot. A temperature of about 200°–400°F., depending upon the type of glue employed, has been shown satisfactory. Thus, material 50, as it emerges from the rollers 54 and 56, has sequential patterns of glue 55 on it, as can be seen in FIG. 4. For reasons as will be apparent from the discussion below, each of these patterns is horseshoe-shaped with an open end.

The continuously moving material 24 and the continuously moving material 50 are then pressed together as they move past roller 60 so that the glue patterns formed on material 50 by roller 54 fasten the side of the material 24 opposite the side bearing the spongy masses to one side of material 50. The movements of materials 50 and 24 are coordinated so that a spongy mass will be located within each U-shaped glue pattern on material 50 for reasons which will be apparent from the discussion below. After being glued together, continuously moving sheets 24 and 50 pass between rollers 62 and 64 which serve to compress each spongy mass of material. As the spongy mass emerges from between rollers 62 and 64, apparatus 66 sprays the material with a suitable liquid shoe shining polish. Compressing the sponge before impregnation improves the distribution of shoe shining liquid through the spongy mass. A sprayer 65 then impregnates one side of sheet 50 with a silicone material to improve buffing.

Figure 5:
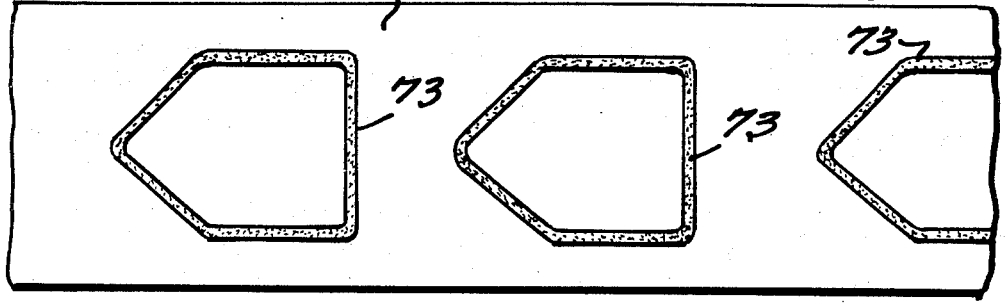
FIG. 5 shows a view of the third sheet along the lines 5—5'.

The third sheet of material which forms the disposable mitt of this invention is continuously unwound from a roll 70 at the same time that sheets 24 and 50 are being unrolled. Sheet 72 similarly passes between rollers 74 and 76, and roller 74, like roller 54, deposits a pattern of hot-melt glue on sheet 72 in the same fashion as intaglio printing. FIG. 5 shows sheet 72 with the glue patterns 73 thereon, which it can be seen are roughly heart-shaped and are closed. Sheet 72, with the separated patterns of glue thereon, is then pressed between rollers 75 and 77 against the upper surface of sheet 24 which bears the separated and now impregnated masses of spongy material, so that each of the spongy masses falls within the closed region defined by one of the glue patterns on sheet 70. The three sheets which are now glued together then move between rollers 80 and 82 where they are cut into the individual disposable mitts.

Figure 7:
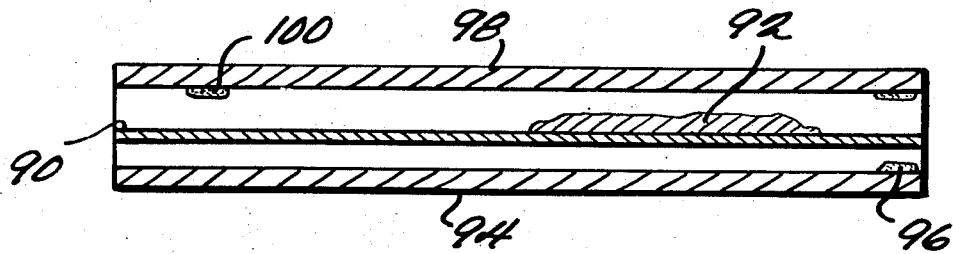
FIG. 7 shows a side cutaway view of the mitt of FIG. 6 along the lines 7—7'.
Figure 6:
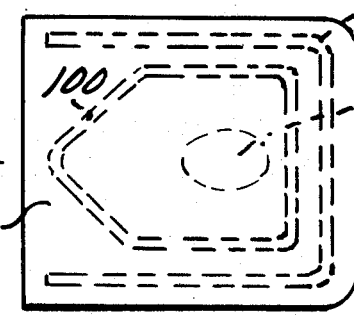
FIG. 6 shows a top view of one of the mitts produced according to the apparatus of FIG. 1.

Referring to FIGS. 6 and 7, one such mitt, further described in the above-mentioned Miller Application, is shown which is comprised of a first sheet 90, a spongy mass of material 92 having shoe shine polish in or on it, a second sheet of material 94 which is glued to sheet 50 by horseshoe-shaped pattern of glue 96 so as to leave an open end into which the fingers can be inserted, and a third sheet 98 which is glued to the second sheet by a glue pattern 100 so as to form a pocket which encloses spongy mass 92 between sheets 96 and 98 and protects it against evaporation until used.

One way in which the disposable mitt shown in FIGS. 6 and 7 can be employed is by first removing sheet 98 to expose the spongy mass 92. By inserting the fingers into the open pocket between sheets 90 and 94, the shoe shine and spongy mass 92 can be applied and rubbed over the shoes without in any way soiling the fingers or applying the shoe shine polish to any other object. After a suitable amount of the shoe polish has been applied, the mitt can be reversed on the hand so that the palm faces sheet 94 and buffing sheet 94 can then be used to buff the shoes in conventional fashion resulting in a highly satisfactory shine.

Figure 8:
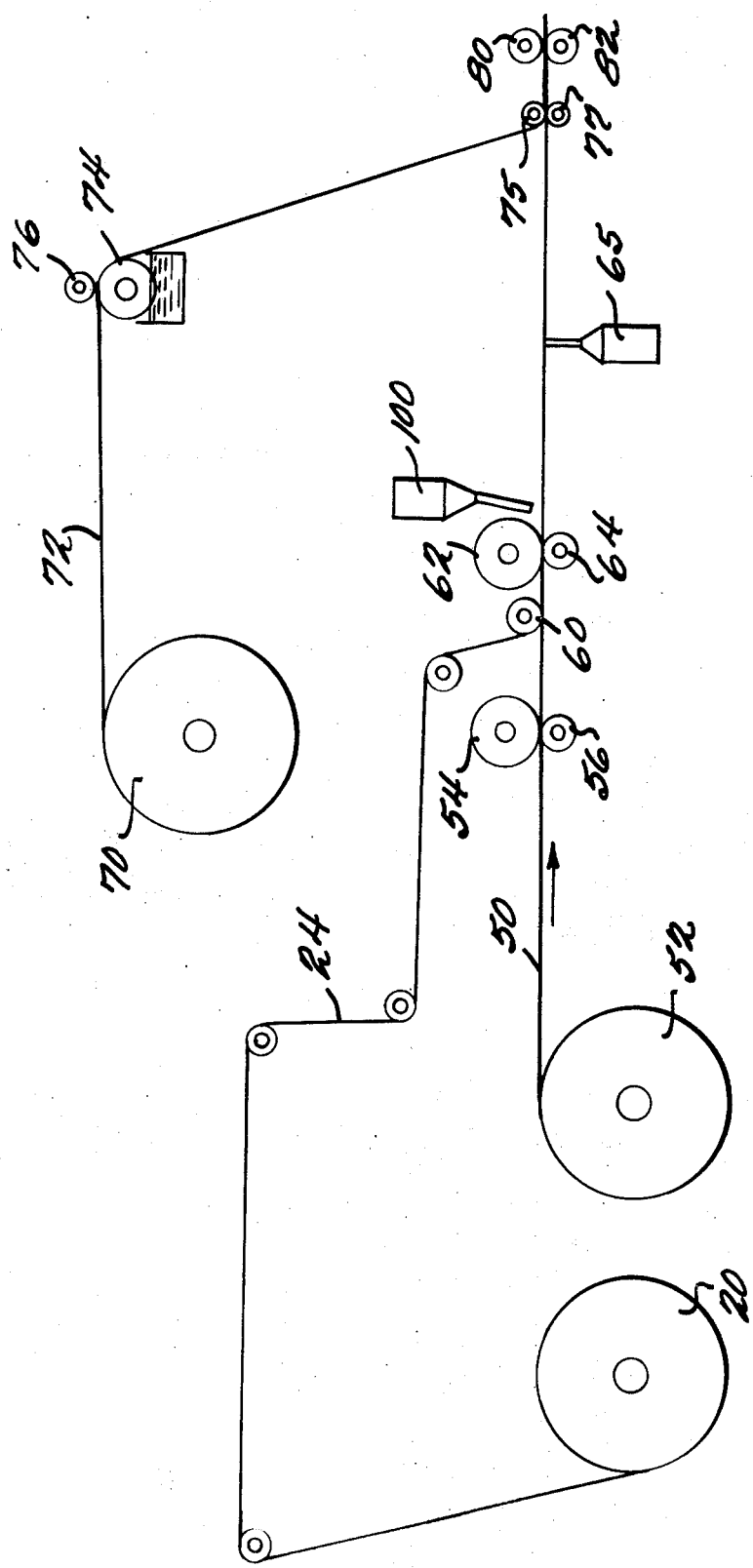
FIG. 8 shows a schematic view of a further apparatus for producing a disposable shoe shine mitt.

FIG. 8 shows a further embodiment in which suitable quantities of microcapsules each containing a shoe shine polish are periodically deposited on sheet 24 from a suitable hopper 100. Sheet 24 is glued to sheet 50 in the same fashion discussed above and similarly sheet 24 is glued to sheet 72. The elements of FIG. 8 which bear the same numbers as the elements of FIG. 1 perform the same functions.

The mitt produced by the apparatus of FIG. 8 appears the same as the mitt of FIGS. 6 and 7. However to use a mitt having microcapsules, the third sheet is preferably not removed and the polish from the broken microcapsules permitted to seep through the third sheet as the mitt is rubbed over the shoe. The mitt is thereafter reversed on the hand for buffing.

Many changes and modifications in the above embodiments of the invention can be made without departing from the scope of the invention. Accordingly, that scope is intended to be limited only by the scope of the appended claims.

What is claimed is:

1. Apparatus for producing a disposable mitt for shining shoes comprising:

means for providing a quantity of shoe shining material at each of a plurality of separated locations on one side of a first extending sheet of first material, first means for gluing the side of said first sheet opposite said one side to one side of a second extending sheet of buffing material so as to form a plurality of pockets between said sheets, each having an open side, second means for gluing said one side of said first sheet to one side of a third extending sheet so as to form a plurality of closed pockets each containing one of said quantities of shoe shining material and means for cutting together said three sheets at separated locations so as to form disposable mitts each having one of said pockets between said first and second sheets for receiving the fingers of a hand and one of said closed pockets containing one of said quantities.

2. Apparatus in claim 1 wherein said shoe shining material is contained in a spongy mass further including means for impregnating said masses with liquid shoe shining material.

3. Apparatus as in claim 1 wherein said providing means includes means for depositing microcapsules each containing said shoe shine material.

4. Apparatus as in claim 1 further including means for continuously moving said first, second and third sheets.

5. Apparatus as in claim 4 wherein said forming means includes means for periodically applying a mass of foam material in fluid state to the moving first sheet, and drier means adjacent the path of movement of said first sheet for solidifying the foam masses added.

6. Apparatus as in claim 4 wherein said forming means includes means for intermittently removing sponge masses serially mounted on a substrate from that substrate and attaching the removed mass onto said first sheet.

7. Apparatus as in claim 1 wherein said first gluing means includes a first cylindrical roller which rotates as said second sheet moves for laying a first pattern of glue on said one side of said second sheet at separated locations and a second roller which presses said second sheet with said glue pattern on said one side against said first sheet, and said second gluing means includes a third cylindrical roller which rotates as said third sheet moves for laying a second pattern of glue on said one side of said third sheet at separated locations and a fourth roller which presses said third sheet with said glue pattern on said one side against said second sheet.

* * * * *